(12) United States Patent
Vandeweerd et al.

(10) Patent No.: US 9,886,232 B2
(45) Date of Patent: Feb. 6, 2018

(54) MOBILE ELECTRONIC DEVICE AND METHOD FOR CONTROLLING A MEDIA PLAYER DEVICE TO PLAY BACK MEDIA

(71) Applicant: BlackBerry Limited, Waterloo (CA)

(72) Inventors: Sean Vandeweerd, Etobicoke (CA); Sanjay Nathwani, Mississauga (CA)

(73) Assignee: BLACKBERRY LIMITED, Waterloo (CA)

( * ) Notice: Subject to any disclaimer, the term of this patent is extended or adjusted under 35 U.S.C. 154(b) by 505 days.

(21) Appl. No.: 14/317,536

(22) Filed: Jun. 27, 2014

(65) Prior Publication Data

US 2015/0378666 A1  Dec. 31, 2015

(51) Int. Cl.
*G06F 3/16* (2006.01)
*H04N 21/41* (2011.01)
(Continued)

(52) U.S. Cl.
CPC ............. *G06F 3/165* (2013.01); *G05B 15/02* (2013.01); *H04N 21/4126* (2013.01); *H04N 21/42203* (2013.01); *H04N 21/43615* (2013.01); *H04N 21/43637* (2013.01); *H04N 21/4415* (2013.01); *H04N 21/44227* (2013.01); *H04N 21/4532* (2013.01); *H04N 21/4751* (2013.01); *H04W 4/008* (2013.01); *H04N 21/4222* (2013.01); *H04N 21/42207* (2013.01);
(Continued)

(58) Field of Classification Search
CPC ........... H04M 1/7253; H04M 1/72558; H04M 1/72569; H04R 2227/003; H04R 2420/07; H04R 2499/11; H04R 2499/13; H04S 7/301; H04W 4/008

USPC .......... 348/180; 381/58, 86; 455/41.2, 63.1, 455/67.11, 226.1; 700/94; 709/201, 213, 709/231
See application file for complete search history.

(56) References Cited

U.S. PATENT DOCUMENTS 6,957,134 B2   10/2005   Ramseyer et al.
6,980,837 B2   12/2005   Chung
(Continued)

OTHER PUBLICATIONS

European Extended Search Report dated Oct. 27, 2015 for European Patent Application No. 15174016.4.
(Continued)

*Primary Examiner* — Paul McCord
*Assistant Examiner* — Alexander Eljaiek
(74) *Attorney, Agent, or Firm* — Perry + Currier Inc.

(57) ABSTRACT

According to embodiments described in the specification, a mobile electronic device and method for controlling a media player device to play back media are provided. The mobile device includes: a network interface; a memory storing first audio data and second audio data; a microphone; and a processor interconnected with the network interface, the memory and the microphone, the processor operating to: transmit, to a media player device via the network interface, a request to initiate a connection between the mobile device and the media player device; send the first audio data over the connection to the media player device for playback by the media player device; detect the playback of the first audio data via the microphone; and in response to detecting playback of the first audio data, send the second audio data over the connection to the player device for playback by the media player device.

12 Claims, 5 Drawing Sheets

(51) Int. Cl.
  *H04N 21/422* (2011.01)
  *H04N 21/436* (2011.01)
  *H04N 21/4363* (2011.01)
  *H04N 21/4415* (2011.01)
  *H04N 21/442* (2011.01)
  *H04N 21/45* (2011.01)
  *H04N 21/475* (2011.01)
  *G05B 15/02* (2006.01)
  *H04W 4/00* (2009.01)

(52) U.S. Cl.
  CPC . *H04N 21/42208* (2013.01); *H04N 21/42222* (2013.01); *H04N 21/42224* (2013.01)

(56) References Cited

U.S. PATENT DOCUMENTS

| | | |
|---|---|---|
| 2006/0233519 A1 | 10/2006 | Narita |
| 2011/0275320 A1* | 11/2011 | Pattenden .............. H04B 17/21 455/41.2 |
| 2012/0155661 A1 | 6/2012 | Ma et al. |
| 2013/0114380 A1 | 5/2013 | Bryger et al. |
| 2014/0152899 A1 | 6/2014 | Newell |
| 2014/0181997 A1 | 6/2014 | Kumar et al. |

OTHER PUBLICATIONS

Communication pursuant to Artilce 94(3) EPC dated May 15, 2017 for European Patent Application No. 15174016.4.

* cited by examiner

| Media Player ID | Lag Time |
|---|---|
| 108a | 2.0s |
| ABC | -1.5s |
| ... | ... |

304-1 → (row 1)
304-2 → (row 2)

MOBILE ELECTRONIC DEVICE AND METHOD FOR CONTROLLING A MEDIA PLAYER DEVICE TO PLAY BACK MEDIA

FIELD

The specification relates generally to media playback, and specifically to a mobile device and method for controlling a media player device to play back media.

BACKGROUND

Mobile electronic devices, such as smart phones, may interact with a wide variety of other computing devices, including devices capable of playing media, such as a vehicle stereo systems. Mobile electronic devices may be capable of playing audio or video via such computing devices. However, connections between mobile electronic devices and media-playing devices may be implemented in a wide variety of ways, and as a result the quality of media playback may be negatively affected.

BRIEF DESCRIPTIONS OF THE DRAWINGS

Embodiments are described with reference to the following figures, in which.

DETAILED DESCRIPTION OF THE EMBODIMENTS

According to an aspect of the specification, a mobile device is provided, comprising: a network interface; a memory storing first audio data and second audio data; a microphone; and a processor interconnected with the network interface, the memory and the microphone, the processor operating to: transmit, to a media player device via the network interface, a request to initiate a connection between the mobile device and the media player device; send the first audio data over the connection to the media player device for playback by the media player device; detect the playback of the first audio data via the microphone; and in response to detecting playback of the first audio data, send the second audio data over the connection to the player device for playback by the media player device.

According to another aspect of the specification, a method is provided in a mobile device having a processor interconnected with a network interface, a memory and a microphone. The method comprises: storing first audio data and second audio data in the memory; transmitting, from the processor to a media player device via the network interface, a request to initiate a connection between the mobile device and the media player device; sending the first audio data over the connection to the media player device for playback by the player device; detecting, at the processor, the playback of the first audio data via the microphone; and in response to detecting playback of the first audio data, sending the second audio data over the connection to the media player device for playback by the media player device.

According to a further aspect of the specification, a non-transitory computer-readable medium is provided storing a plurality of computer-readable instructions executable by a processor of a mobile device having a network interface, a memory and a microphone interconnected with the processor, for performing the above method.

Figure 1:
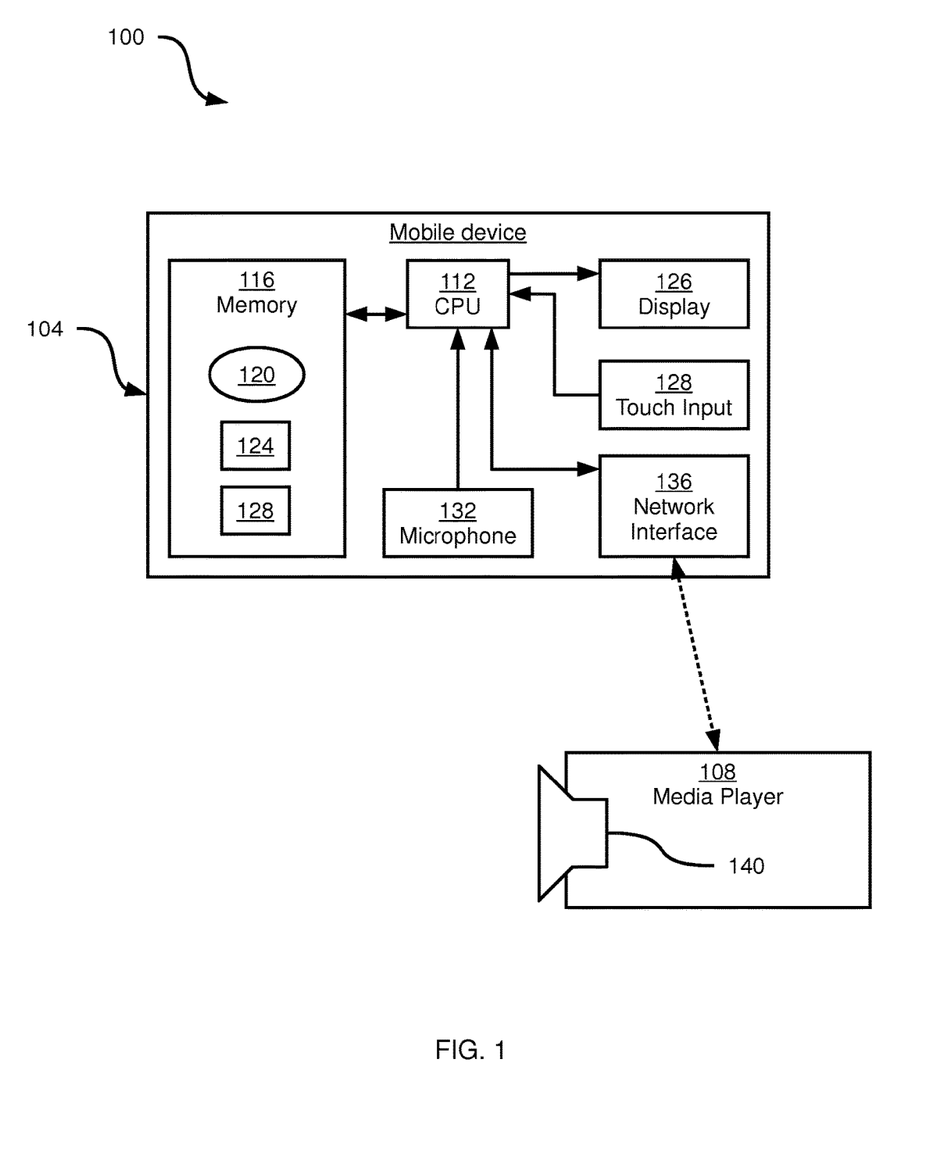
FIG. 1 depicts a system including a mobile device operating to control a media player device, according to a non-limiting embodiment.

FIG. 1 depicts a system 100 including a mobile device 104 and a media player device 108. Mobile device 104 can be any one of a cellular phone, a smart phone, a tablet computer, and the like. In general, and as will be discussed in greater detail below, mobile device 104 is a device capable of storing media, such as audio data, and of transmitting that media to media player device 108 for playback by media player device 108. In addition, as will also be discussed below in greater detail, mobile device 104 is capable of adapting to characteristics of media player device 108 that may vary depending on the nature and manufacturer of media player device 108.

Media player device 108 can be any of a wide variety of devices capable of receiving media (such as audio data) from mobile device 104 and playing that media. Thus, media player device 108 can be a stereo system, or component thereof, located in a home, a vehicle, or any other suitable location. Media player device 108 can also be another mobile device such as a smart phone, a public address (PA) system, a television, and the like. In the examples discussed herein, media player device 108 is a component of a stereo system mounted in a vehicle (not shown). However, the teachings herein can readily be applied to other media player devices, including but not limited to those mentioned above.

Before discussing the functionality of mobile device 104 and media player device 108 in greater detail, certain internal components of mobile device 104 and media player device 108 will be described.

Mobile device 104 includes a central processing unit (CPU) 112, also referred to herein as processor 112, interconnected with a computer readable storage medium such as a memory 116. Memory 116 can include any suitable combination of volatile memory (e.g. random access memory (RAM)) and non-volatile memory (e.g. read only memory (ROM), Electrically Erasable Programmable Read Only Memory (EEPROM), flash memory, magnetic hard disc, or optical disc).

Memory 116 stores computer readable instructions executable by processor 112, including a remote media player application 120, also referred to herein as application 120. It is contemplated that other computer readable instructions can also be stored in memory 116, including an operating system. In the present example, memory 116 also stores media including first audio data 124 and second audio data 128. First and second audio data 124 and 128 contain data representing audible sounds encoded according to any suitable format (e.g. MP3, FLAC), which, when provided to a playback device, can be emitted as audible sound by the playback device. In other embodiments, a wide variety of other media may also be stored in memory 116 and employed in the operations performed by mobile device 104 to be described below.

Processor 112 and memory 116 are generally comprised of one or more integrated circuits (ICs), and can have a variety of structures, as will now occur to those skilled in the art (for example, more than one CPU can be provided). Processor 112 executes the instructions of application 120 to perform, in conjunction with the other components of mobile device 104, various functions related to playing media via media player device 108. In the below discussion of those functions, mobile device 104 is said to perform, or operate to perform, those functions. It will be understood that mobile computing device 104 is configured to perform those functions via the processing of the computer readable instructions in memory 116 (including those of application 120) by the hardware components of mobile computing device 104 (including processor 112). More particularly, processor 112 can be said to operate to perform those functions by executing the instructions in memory 116.

Mobile device 104 also includes a display 126 interconnected with processor 112. Display 126 includes one or more display panels based on any suitable panel technology (e.g. liquid crystal display (LCD), organic light emitting diode (OLED), and the like), and receives data for presentation on such panels from processor 112. In addition, mobile device 104 includes a touch input device 128 interconnected with processor 112, for receiving input (e.g. from an operator of mobile device 104) and providing input representing such input to processor 112. Touch input device 128 can include any suitable combination of buttons and keypads, touch screens integrated with display 126, and the like.

Mobile device 104 also includes a microphone 132 interconnected with processor 112. Microphone 132 detects sound from the environment of mobile device 104 and provides data representing such sound to processor 112. Mobile device 104 may also include other input devices, such as a camera, a GPS receiver, sensors such as light and motion sensors and the like. Such devices are not shown however, as they do not relate directly to the functionality of mobile device 104 to be described herein.

Mobile device 104 also includes a network interface 136 interconnected with processor 112, which allows mobile device 104 to communicate with other devices, including media player device 108. In the present example, network interface 136 enables mobile device 104 to communicate with media player device 108 over a wireless link, such as a link based on the Bluetooth™ standard. Other wireless links, as well as wired links, are also contemplated. Network interface 136 thus includes the necessary hardware, such as radio transmitter/receiver units, network interface controllers and the like, to communicate over the above-mentioned links.

Media player device 108 includes a processor, memory and network interface (not shown). In addition, media player device 108 includes one or more output devices for media playback. Such devices can include displays, speakers and the like. In the present example, media player device 108 includes a speaker 140, which the processor of media player device 108 can control to play back audio data received from mobile device 104.

As noted earlier, mobile device 104 sends media, including audio data, to media player device 108, and media player device 108 plays back that media upon receipt. As will now be discussed in greater detail with reference to FIG. 2, mobile device 104 also operates to detect when a connection between mobile device 104 and media player device 108 is ready for media playback (that is, ready for media to be transmitted from mobile device 104 to media player device 108).

Figure 2:
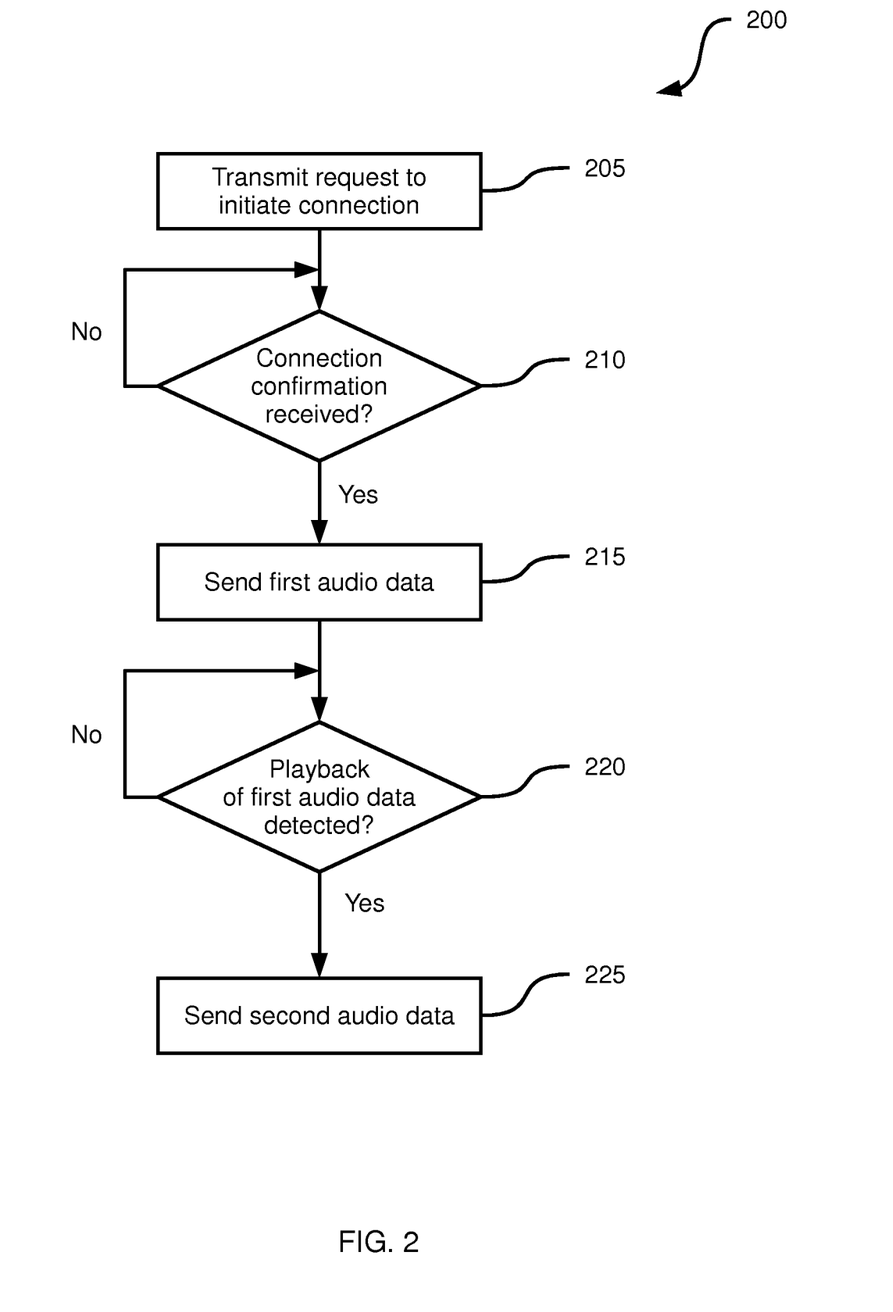
FIG. 2 depicts a method of controlling the media player device of FIG. 1 to play back media, according to a non-limiting embodiment.

Referring to FIG. 2, a method 200 of controlling a media player device to play back media is illustrated. Method 200 will be described in conjunction with its performance on mobile device 104. That is, the blocks of method 200 as described below are performed by mobile device 104 via the execution of instructions stored in memory 116 by processor 112. It is contemplated, however, that method 200 can also be performed by other devices than mobile device 104.

At block 205, mobile device 104 transmits a request to media player device 108 to initiate a connection between mobile device 104 and media player device 108. Block 205 can be performed by mobile device 104 in response to an input from an operator, for example a command via touch input 128 to play a song via speaker 140. Another example of the impetus to perform block 205 is a command to play audio generated automatically by a turn-by-turn directions application being executed by processor 112, in order to play text-to-speech audio dictating the next turn for a vehicle to take via speaker 140 mounted within the vehicle.

The nature of the request sent by mobile device 104 at block 205 is not particularly limited. In general, processor 112 controls network interface 136 to transmit the request to media player device 108 using a connection protocol compatible with media player device 108. For example, where the connection is to be based on the Bluetooth™ standard, the request sent at block 205 may comply with the requirements of any suitable Bluetooth™ profile specification, such as the Hands-Free Profile (HFP) specification, which is incorporated herein by reference.

Proceeding to block 210, mobile device 104 determines whether media player device 108 has sent a confirmation to mobile device 104 that the connection requested at block 205 has been established. Upon receiving the request sent at block 205, media player device 108 may undertake various internal operations, and exchange various messages with mobile device 104, to set up a connection suitable for receiving media from mobile device 104. Media player device 108 can therefore send a message to mobile device 104 once those operations are complete, informing mobile device 104 that the connection is ready to receive media (e.g. audio data).

As will now become apparent to those skilled in the art, there may be significant variation between different types of media player device, and between different manufacturers of the same type of media player device, in the timing of the confirmation message to mobile device 104. For example, media player device 108 may send the confirmation message to mobile device 104 immediately after basic connection parameters have been agreed on (such as authentication parameters and address/port information). Although such parameters are established, in some cases media player device 108 will not yet have completed other internal operations necessary to provide access to speaker 140 for mobile device 104. In other words, the confirmation sent from media player device 108 to mobile device 104 may be premature. In such cases, audio data sent to media player device may simply be dropped (not played back through speaker 140) for a certain time period (e.g. 0.5 to 3 seconds), resulting in the desired audio being cut off.

In other cases, the confirmation may be delayed, such that media player device 108 does not inform mobile device 104 that the connection is ready until some time after the connection is actually ready to receive and play media.

When the determination at block 210 is negative (that is, mobile device 104 determines that no confirmation has been received from media player device 108), mobile device 104 can repeat the determination at block 210. When the determination at block 210 is affirmative (that is, mobile device 104 determines that confirmation has been received from media player device 108), the performance of method 200 proceeds to block 210.

It is contemplated that in some embodiments, the determination at block 210 can be omitted, and mobile device 104 can proceed directly from block 205 to block 215, without awaiting confirmation from media player device 108 that a connection has been established.

At block 215, mobile device 104 retrieves first audio data 124 from memory 116 and sends first audio data 124 over the connection established between mobile device 104 and player device 108, for playback (via speaker 140) by media player device 108. Either after or during the transmission of first audio data 124 from mobile device 104 to media player device 108, at block 220 mobile device 104 determines whether playback of first audio data 124 via speaker 140 has begun. The determination at block 220 can be made by monitoring microphone 132 at processor 112, to determine whether microphone 132 has detected sound that matches first audio data 124.

Various suitable implementations of block 220 will now occur to those skilled in the art. For example, microphone 132 may be enabled by processor 112 at some point prior to the performance of block 220 (such as at block 205, or when confirmation is received at block 210); microphone 132, when enabled, can transmit a stream of data to processor 112 corresponding to sounds currently being detected by microphone 132. Processor 112 can cause the data received from microphone 132 to be stored in memory 116 and compared to first audio data 124. The data received from microphone 132 can be appended to a single growing audio file in memory 116, or processor 112 can be configured to store a predefined duration of data received from microphone 132 (for example, five seconds of detected sound) before discarding the stored data and beginning a new recording.

It will now be apparent from the above that the data received at processor 112 from microphone 132 may not match first audio data 124 perfectly. Background noise may also be captured by microphone 132, such as conversations, music, traffic noise, and the like. Thus, first audio data 124 is selected to be readily identifiable by processor 112 against background noise, and may also specify a volume that is expected to rise above common background noises. A wide variety of suitable sounds are contemplated for first audio data 124. For example, first audio data 124 may define a series of discrete (that is, non-overlapping in time) tones having the same frequency or different frequencies. First audio data 124 may also have a variable volume, such as an escalating volume. Further, first audio data 124 can repeatedly be sent during the performance of block 220, allowing for a limited size of first audio data 124 in memory 116 without overly limiting the possible playtime of first audio data 124.

When the determination at block 220 is negative (that is, when processor 112 determines that the sounds being detected by microphone 132 do not correspond to first audio data 124), mobile device 104 can continue to record sounds from microphone 132 and wait until such sounds do match first audio data 124. In some embodiments (not shown), mobile device 104 can abort the performance of method 200 when a predefined timeout period elapses after block 215, without an affirmative determination at block 220.

When the determination at block 220 is affirmative (that is, when processor 112 determines that the sounds being detected by microphone 132 do correspond to first audio data 124, or at least to a portion of first audio data 124), the performance of method 200 proceeds to block 225.

At block 225, mobile device 104 retrieves second audio data 128 from memory 116 and sends second audio data 128 to media player device 108 for playback via speaker 140. The nature of second audio data 128 is not particularly limited. Second audio data 128 may be, for example, music, the incoming voice channel for an ongoing phone call at mobile device 104, spoken turn-by-turn directions (which may be generated by mobile device 104 using any known text-to-speech process).

As will now be apparent, the performance of method 200 configures mobile device 104 to confirm that a connection with media player device 108 is ready to carry audio data for playback via speaker 140 before second audio data 128 is sent to media player device 108. This may reduce the likelihood of a portion of second audio data 128 being sent by mobile device 104 but not played by media player 108 (for example, because media player 108 is not actually ready to receive audio, despite having informed mobile device 104 that it is ready at block 210).

Figure 3:
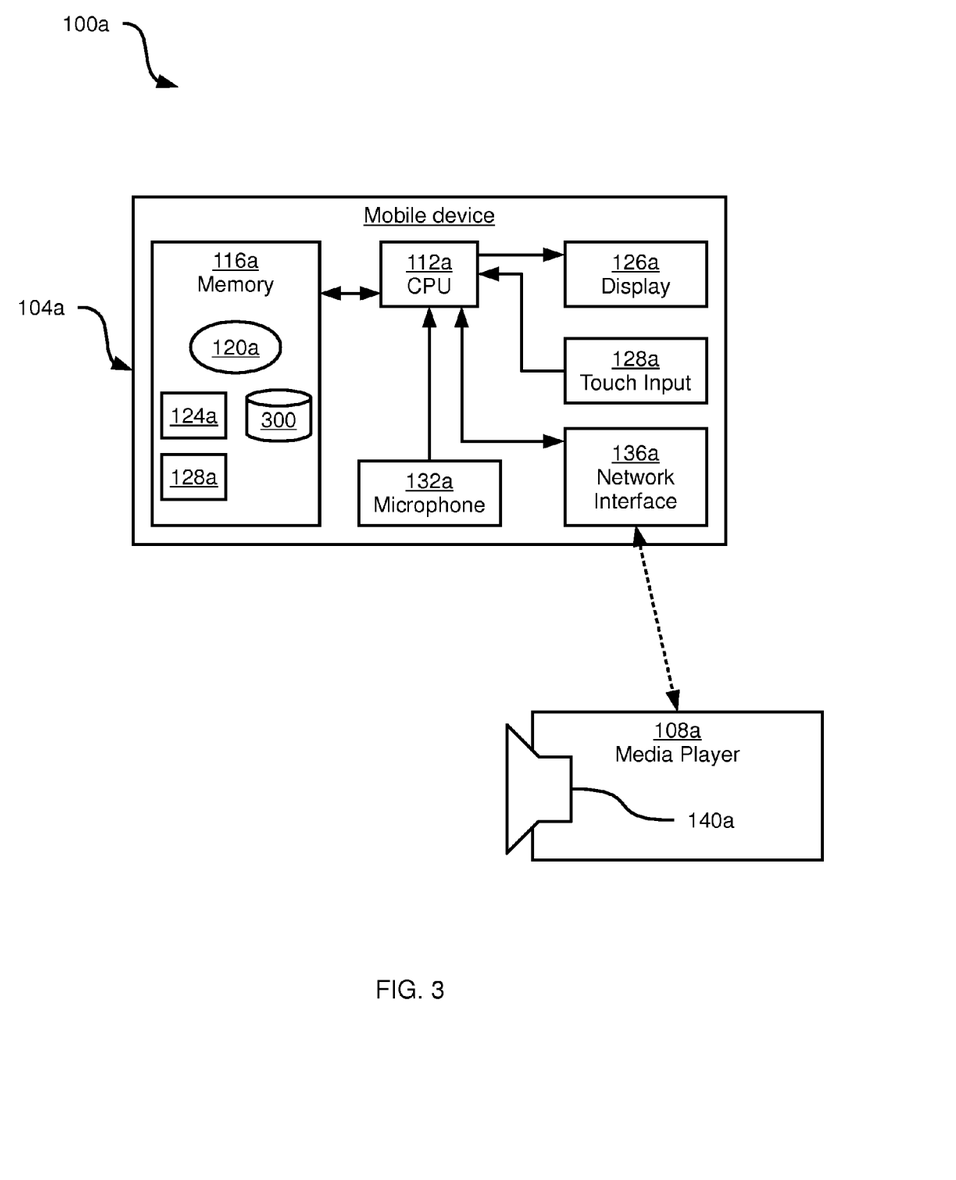
FIG. 3 depicts a variation of the system of FIG. 1, according to a non-limiting embodiment.

Referring now to FIG. 3, a system 100a is illustrated, which is a variation of system 100 discussed above. Like components between systems 100 and 100a bear like reference numbers, with the exception that the components of system 100a include the suffix "a". Thus, system 100a includes a mobile device 104a and a media player device 108a that are generally equivalent to mobile device 104 and media player device 108 (except where differences are noted below). Mobile device 104a includes a processor 112a interconnected with a display 126a, a touch input 128a, a microphone 132a and a network interface 136a. Media player device 108a is as described above in connection with media player device 108, including a speaker 140a equivalent to speaker 140.

Mobile device 104a also includes a memory 116a, which is generally equivalent to memory 116 of mobile device 104. Memory 116a stores an application 120a, first audio data 124a, and second audio data 128a. In addition, memory 116a stores a database 300 of various media player devices and certain parameters associated with such media player devices.

Figure 4:
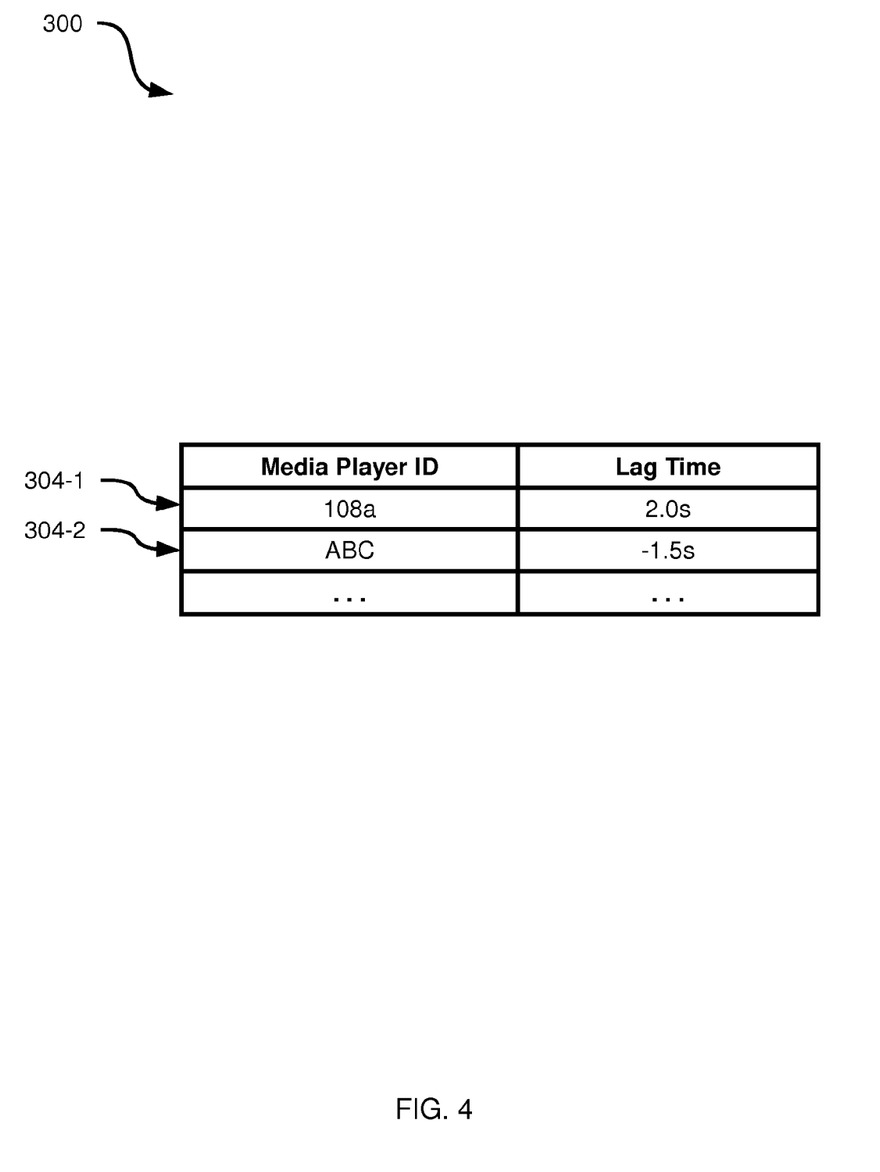
FIG. 4 depicts an example of a database stored by the mobile device of FIG. 3, according to a non-limiting embodiment.

An example of the contents of database 300 is shown in FIG. 4. It is contemplated that although database 300 is shown in a tabular format in FIG. 4, a wide variety of other suitable formats may also be employed to store database 300. Database 300 includes a plurality of records 304-1, 304-2, and so on, generically referred to as a record 304, and collectively referred to as records 304. Each record 304 includes an identifier of a media player device such as media player device 108a (identified in record 304-1 in FIG. 4). Each record 304 also includes a corresponding "lag time" parameter for the relevant media player device. Thus, record 304-1 indicates that the lag time for media player device 108a is two seconds, and record 304-2 indicates that the lag time for another media player device (not shown) having the identifier "ABC" is negative one and a half seconds.

The lag time parameters mentioned above are indications of the time elapsed between the receipt of confirmation that a connection is ready, as described in connection with block 210 above, and the time that the connection is actually ready for audio playback (as detected at block 220). Thus, a positive lag time indicates that media player device 108a reports that the connection is ready before it is truly ready for audio playback, while a negative lag time indicates that the other media player device does not inform mobile device 104a that the connection is ready until 1.5 seconds after the connection is actually ready.

Figure 5:
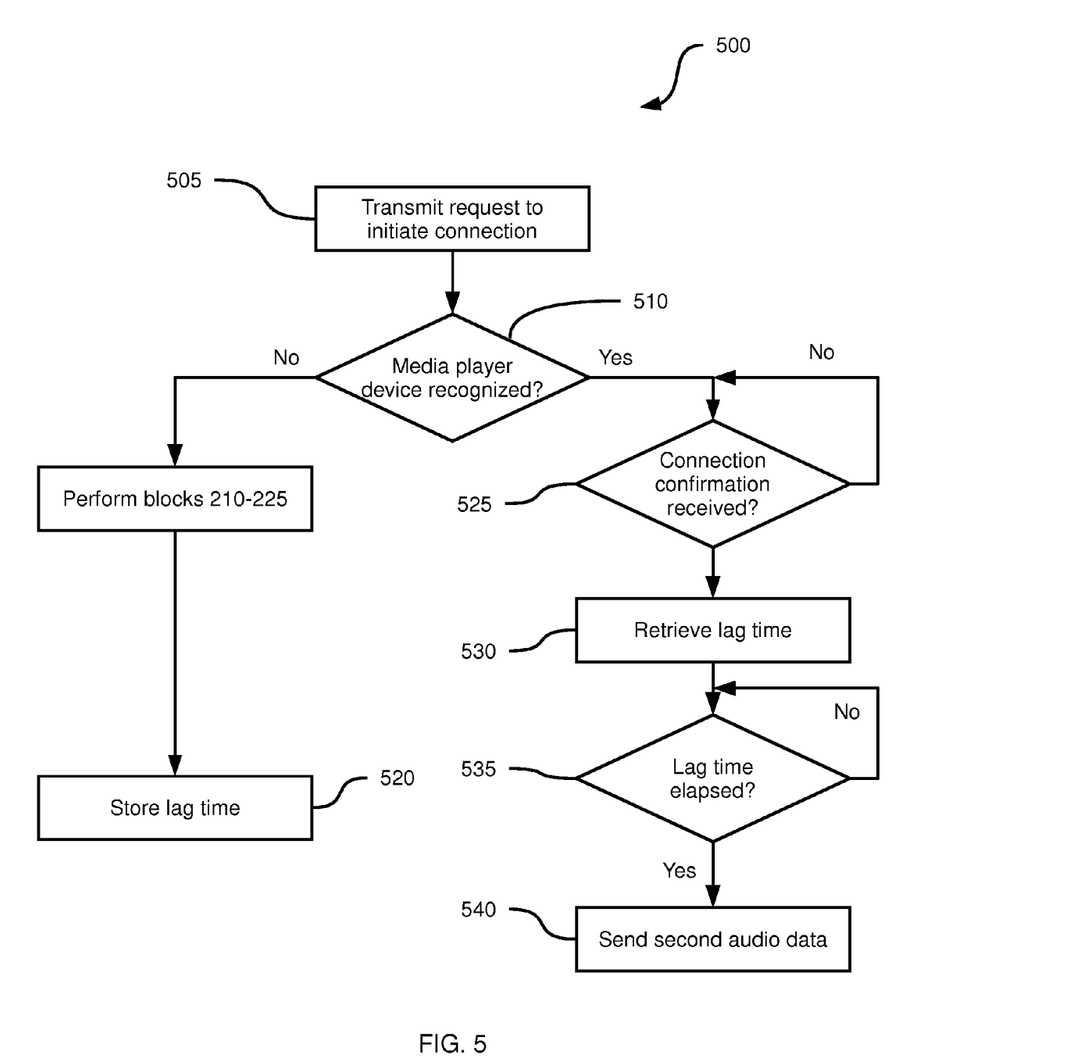
FIG. 5 depicts a method of controlling the media player device of FIG. 3 to play back media, according to a non-limiting embodiment.

Turning now to FIG. 5, a method 500 of controlling a media player device to play back media is illustrated, making use of database 300. As with method 200, the blocks of method 500 are performed by mobile device 104a via the execution of application 120a at processor 112a.

At block 505, mobile device 104a transmits a request to a media player device (such as media player device 108a) as described earlier in connection with block 205. At block 510, mobile device 104a determines whether media player device 108a is recognized, by comparing an identifier obtained from media player device 108a with database 300. When the identifier is present in database 300, the determination at block 510 is affirmative, and when the identifier is not present in database 300, the determination at block 510 is negative. The identifier can be obtained from media player device 108a in response to the request transmitted at block 505, or prior to that request (for example, media player device 108a may broadcast its identifier).

When the determination at block 510 is negative, mobile device 104a performs blocks 210 to 225 of method 200 as discussed above. Following the performance of blocks 210 to 225, at block 520 mobile device 104a may update database 300 by generating and storing a record for the previously unrecognized media player device subject to the performance of blocks 210 to 225. That is, mobile device 104a can measure the time elapsed between the confirmation received at block 210 and an affirmative determination at block 220. Mobile device 104a can then create a new record in database 300 at block 520, and store that measured lag time in the new record along with an identifier of the previously unrecognized media player device.

However, when the determination at block 510 is affirmative, mobile device 104a proceeds to block 525. At block 525, mobile device 104a determines whether a message confirming that the connection is ready has been received from media player device 108a, as described earlier in connection with block 210. When the determination at block 525 is affirmative, mobile device 104a proceeds to block 530, where mobile device 104a retrieves the lag time corresponding to the identifier searched at block 510. Thus, in the present example, mobile device 104a retrieves the lag time of record 304-1, which corresponds to the identifier of media player device 108a. It is contemplated that the lag time may also be retrieved before the confirmation is received at block 525.

Proceeding to block 535, mobile device 104a determines whether a period of time beginning when the confirmation was received at block 525 and having a length equal to the lag time has elapsed. When the lag time has elapsed, the performance of method 500 proceeds to block 540, at which mobile device 104a retrieves second audio data 128a from memory 116a and sends second audio data 128a to media player device 108a for playback via speaker 140a. Thus, when interacting with known media player devices, mobile device 104a can make use of database 300 to obviate the need for first audio data 124.

Further variations to the above are contemplated, for example to handle negative lag times. For example, in some embodiments, mobile device 104a performs block 530 before block 525, and also determines whether the lag time retrieved at block 530 is negative. When the lag time is negative, mobile device 104a can omit blocks 525 and 535, and simply begin transmitting first audio data 124a immediately (since the confirmation is known to be sent "late" by the media player device).

Database 300 can contain other parameters instead of, or in addition to, the lag times mentioned above. For example, database 300 can contain, for each media player device identified therein, a time period representing the total elapsed time between the request transmitted at blocks 205 or 505, and the successful establishment of a connection over which audio can be sent.

In other variations, the two "branches" of method 500 can be combined. For example, responsive to lag time elapsing at block 535, mobile device 104a can send first audio data 124a to media player device 108a, instead of second audio data 128a. Such an arrangement may be suitable where a lag time stored in database 300 is suspected of being inaccurate. Database 300 may additionally contain an indication of a level of confidence in a given lag time. For example, the first time a lag time is stored for a given media player device at block 520, a low confidence may be attached to the lag time. As repeated measurements are taken for that particular media player device, the confidence level may be adjusted upwards if the measurements coincide with each other, or downwards if they do not coincide.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A mobile device, comprising:
a network interface;
a memory storing first audio data and second audio data, and a database containing a record including a media player device identifier and a corresponding lag time, the corresponding lag time comprising an indication of a time elapsed between a receipt of confirmation from a media player device, identified by the media player device identifier, that a connection is ready and an actual time that the connection is ready for audio playback, a positive lag time indicating that the media player device reports that the connection is ready before it is actually ready for the audio playback, and a negative lag time indicating that the media player device reports that the connection is ready after it is actually ready for the audio playback;
a microphone; and
a processor interconnected with the network interface, the memory and the microphone, the processor operating to:
transmit, to the media player device via the network interface, a request to initiate a connection between the mobile device and the media player device;
responsive to transmitting the request to initiate the connection, receive an identifier of the media player device;
when the identifier is not present in the database and a confirmation has been received from the media player device that the connection is ready:
send the first audio data over the connection to the media player device for playback by the media player device;
detect the playback of the first audio data via the microphone; and
in response to detecting playback of the first audio data, send the second audio data over the connection to the player device for playback by the media player device;
when the identifier matches the media player device identifier present in the database, the confirmation has been received, and the corresponding lag time is positive: when a period of time has elapsed beginning from when the confirmation was received and having a length equal to the corresponding lag time: send the second audio data over the connection; and, when the identifier matches the media player device identifier present in the database, and the corresponding lag time is negative: send the second audio data over the connection to the player device for playback by the media player device when the identifier is received and prior to the confirmation being received.

2. The mobile device of claim 1, wherein the first audio data comprises a series of discrete tones.

3. The mobile device of claim 1, wherein detecting the playback of the first audio data comprises:
receiving recorded data from the microphone and storing the recorded data; and
comparing at least a portion of the recorded data to the first audio data.

4. The mobile device of claim 1, wherein the processor is further operating to: when the identifier matches the media player device identifier present in the database, and the corresponding lag time is negative: send the second audio data over the connection to the player device for playback by the media player device immediately when the identifier is received and prior to the confirmation being received.

5. A method comprising:
in a mobile device having a processor interconnected with a network interface, a memory storing first audio data and second audio data, and a database containing a record including a media player device identifier and a corresponding lag time, and a microphone, the corresponding lag time comprising an indication of a time elapsed between a receipt of confirmation from a media player device, identified by the media player device identifier, that a connection is ready and an actual time that the connection is ready for audio playback, a positive lag time indicating that the media player device reports that the connection is ready before it is actually ready for the audio playback, and a negative lag time indicating that the media player device reports that the connection is ready after it is actually ready for the audio playback, transmitting, from the processor to the media player device via the network interface, a request to initiate a connection between the mobile device and the media player device;
responsive to the transmitting the request to initiate the connection, receiving an identifier of the media player device;
when the identifier is not present in the database and a confirmation has been received from the media player device that the connection is ready:
sending the first audio data over the connection to the media player device for playback by the player device;
detecting, at the processor, the playback of the first audio data via the microphone; and
in response to detecting playback of the first audio data, sending the second audio data over the connection to the media player device for playback by the media player device;
when the identifier matches the media player device identifier present in the database, the confirmation has been received, and the corresponding lag time is positive: when a period of time has elapsed beginning from when the confirmation was received and having a length equal to the corresponding lag time: sending the second audio data over the connection; and, when the identifier matches the media player device identifier present in the database, and the corresponding lag time is negative: sending the second audio data over the connection to the player device for playback by the media player device when the identifier is received and prior to the confirmation being received.

6. The method of claim 5, wherein the first audio data comprises a series of discrete tones.

7. The method of claim 5, wherein detecting the playback of the first audio data comprises:
receiving recorded data from the microphone and storing the recorded data; and
comparing at least a portion of the recorded data to the first audio data.

8. The method claim 5, further comprising: when the identifier matches the media player device identifier present in the database, and the corresponding lag time is negative: sending the second audio data over the connection to the player device for playback by the media player device immediately when the identifier is received and prior to the confirmation being received.

9. A non-transitory computer-readable medium storing a computer program wherein execution of the computer program is for:
in a mobile device having a processor interconnected with a network interface, a memory storing first audio data and second audio data, and a database containing a record including a media player device identifier and a corresponding lag time, and a microphone, the corresponding lag time comprising an indication of a time elapsed between a receipt of confirmation from a media player device, identified by the media player device identifier, that a connection is ready and an actual time that the connection is ready for audio playback, a positive lag time indicating that the media player device reports that the connection is ready before it is actually ready for the audio playback, and a negative lag time indicating that the media player device reports that the connection is ready after it is actually ready for the audio playback, transmitting, from the processor to the media player device via the network interface, a request to initiate a connection between the mobile device and the media player device;
responsive to the transmitting the request to initiate the connection, receiving an identifier of the media player device;
when the identifier is not present in the database and a confirmation has been received from the media player device that the connection is ready:
sending the first audio data over the connection to the media player device for playback by the player device;
detecting, at the processor, the playback of the first audio data via the microphone; and
in response to detecting playback of the first audio data, sending the second audio data over the connection to the media player device for playback by the media player device;
when the identifier matches the media player device identifier present in the database, the confirmation has been received, and the corresponding lag time is positive: when a period of time has elapsed beginning from when the confirmation was received and having a length equal to the corresponding lag time: sending the second audio data over the connection; and, when the identifier matches the media player device identifier present in the database, and the corresponding lag time is negative: sending the second audio data over the connection to the player device for playback by the media player device when the identifier is received and prior to the confirmation being received.

10. The non-transitory computer-readable medium of claim 9, wherein the first audio data comprises a series of discrete tones.

11. The non-transitory computer-readable medium of claim 9, wherein detecting the playback of the first audio data comprises:
   receiving recorded data from the microphone and storing the recorded data; and
   comparing at least a portion of the recorded data to the first audio data.

12. The non-transitory computer-readable medium of claim 9, wherein execution of the computer program is for: when the identifier matches the media player device identifier present in the database, and the corresponding lag time is negative: sending the second audio data over the connection to the player device for playback by the media player device immediately when the identifier is received and prior to the confirmation being received.

* * * * *